United States Patent [19]

Sekiya et al.

[11] Patent Number: 5,446,680
[45] Date of Patent: Aug. 29, 1995

[54] SYSTEM AND METHOD FOR OBTAINING NETWORK PERFORMANCE DATA

[75] Inventors: Jeffrey G. Sekiya, Raleigh; Michael W. Stayton, Cary; Leo Temoshenko, Carrboro, all of N.C.

[73] Assignee: IBM Business Machines Corporation, Armonk, N.Y.

[21] Appl. No.: 274,565

[22] Filed: Jul. 13, 1994

Related U.S. Application Data

[63] Continuation of Ser. No. 717,249, Aug. 9, 1991, abandoned.

[51] Int. Cl.⁶ .............................................. G01B 7/00
[52] U.S. Cl. ................................. 364/550; 364/514 R; 364/551.01; 395/180; 371/201
[58] Field of Search .............. 364/551.01, 550, 514, 364/DIG. 1, DIG. 2; 371/16.5, 20.1, 29.1; 395/575

[56] References Cited

U.S. PATENT DOCUMENTS

| | | | |
|---|---|---|---|
| 4,112,264 | 9/1978 | Abramson et al. | 371/20.1 |
| 4,463,418 | 7/1984 | O'Quin, II et al. | 364/200 |
| 4,463,442 | 7/1984 | Dachowski et al. | 364/900 |
| 4,545,011 | 10/1985 | Lyon et al. | 371/20.1 |
| 4,574,362 | 3/1986 | Spindel et al. | 395/500 |
| 4,677,588 | 6/1987 | Benjamin et al. | 364/900 |
| 4,688,035 | 8/1987 | Gray et al. | 340/825.52 |
| 4,823,345 | 4/1989 | Daniel et al. | 371/37 |
| 4,858,152 | 8/1989 | Estes | 364/550 |
| 4,930,093 | 5/1990 | Houser et al. | 364/551.01 |
| 4,985,894 | 1/1991 | Suga | 371/16.5 |
| 5,097,469 | 3/1992 | Douglas | 371/20.1 |
| 5,231,593 | 7/1993 | Notess | 364/550 |
| 5,237,677 | 8/1993 | Hirosawa et al. | 371/16.5 |
| 5,243,543 | 9/1993 | Notess | 364/550 |
| 5,331,574 | 7/1994 | Temoshenho et al. | 364/551.01 |

*Primary Examiner*—Ellis B. Ramirez
*Assistant Examiner*—Hal D. Wachsman
*Attorney, Agent, or Firm*—John J. Timar; Gregory M. Doudnikoff

[57] ABSTRACT

A system and method are provided for monitoring network performance in a network controlled by a communication access method. The communication access method is modified to communicate with a network performance monitor so that the communication access method will monitor its internal processing for information units for a predetermined resource upon request of the network performance monitor. The communication access method time stamps each inbound and outbound information unit for the predetermined resource and sends formatted data regarding each information unit, including the time stamp data, to a predetermined exit from the communication access method. The network performance monitor obtains the formatted data from the performance exit and processes the formatted data to determine network performance in relation to the predetermined resource.

8 Claims, 3 Drawing Sheets

FIG. 3

| OFFSET | DESCRIPTION |
|---|---|
| 0-2 | NS HEADER ('810814'X) |
| 3-4 | RESERVED |
| 5-6 | CNM TARGET IDENTIFIER DESCRIPTOR<br>    BITS 0-3 RESERVED<br>    BITS 4-15 PRID |
| 7 | REQUEST/REPLY SPECIFIC INFORMATION<br>    BITS 0-7 RESERVED |
| 8 | START PERFORMANCE TRACE FOR NAMED RESOURCE<br>    CNM CONTROL RU KEY ('1F'X) |
| 9-16 | NAME OF RESOURCE TO START TRACING (EBCDIC) |

FIG. 4

| OFFSET | DESCRIPTION |
|---|---|
| 0-2 | NS HEADER ('810814'X) |
| 3-4 | RESERVED |
| 5-6 | CNM TARGET IDENTIFIER DESCRIPTOR<br>    BITS 0-3 RESERVED<br>    BITS 4-15 PRID |
| 7 | REQUEST/REPLY SPECIFIC INFORMATION<br>    BITS 0-7 RESERVED |
| 8 | STOP PERFORMANCE TRACE FOR NAMED RESOURCE<br>    CNM CONTROL RU KEY ('20'X) |
| 9-16 | NAME OF RESOURCE TO STOP TRACING (EBCDIC) |

SYSTEM AND METHOD FOR OBTAINING NETWORK PERFORMANCE DATA

This application is a continuation of Ser. No. 07/717,249, filed Aug. 9, 1991 now abandoned.

BACKGROUND OF THE INVENTION

1. Field of the Invention

The present invention relates to a system and method for obtaining performance data from a communication access method (CAM) employed to operate a network. More particularly, the present invention relates to a system and method by which a CAM is adapted to deliver formatted network performance data upon request to a predetermined module from which the data is collected by a network performance monitor for further processing thereof.

2. Description of the Related Art

Communication access methods (CAMs), such as VTAM, which is a trademark of the IBM Corporation, are routinely employed to harness the power of mainframe computers for multiple users. CAMs permit the computer to be employed in operating a variety of resources, such as terminals, printers and other peripheral devices, and allow customers/users of the overall computer system to engage the computer and use the available resources. That is, CAMs allow customers/users to share the processing power of a mainframe computer and give them access to the resources associated with the computer.

Given the necessary complexity Of CAMs and the differing requirements of each set of customers/users, a need for a means to monitor the performance of CAMs developed. Network performance monitors (NPMs) were developed to fulfill this need. An NPM obtains transit time and volume statistics from a CAM and processes the statistics to provide performance data to a system operator. Depending on the requirements of the customers/users, the system operator may use the performance data to modify the CAM so as to better serve the customers/users. Modifications can include speeding up certain functions, changing priorities, providing more equitable access to certain resources, etc.

However, CAMs were not designed with NPMs in mind, and therefore interfacing between an NPM and a CAM is presently quite awkward. One function of NPMs is to obtain transit times for transactions which are using the network manager system. To carry out this function, NPMs collect session statistics for transactions. These statistics consist of transit times and volume measurements. To obtain the transit time, the NPM sums the host time and network time for a given transaction as calculated at the internal processing portion of the CAM. This is accomplished by monitoring for path information units (PIUs) associated with the given transaction. Host time is calculated by subtracting the time an outbound PIU passes the internal processing from the time the preceding inbound PIU passes the internal processing, while network time is typically calculated by subtracting the time the outbound PIU passes the internal processing from the time the subsequent inbound PIU passes thereby. Volume measurements are typically the number of bytes contained in each inbound and outbound PIU at the internal processing. The volume measurement includes both system data bytes and user data bytes. System data is defined as that part of a PIU involved in session control on behalf of the user. User data is defined as that part of a PIU involved in processing the user's transaction. The problem in obtaining this data arises in that no means exists in any existing CAM that was designed to cooperate with a network performance monitor, and the NPM must take over portions of the internals of the CAM to obtain the data. One such present procedure is described below.

Typically, a CAM such as VTAM includes a buffer trace function. The customers lusers of the system employ the buffer trace function to identify problems with hardware or software in their network. Presently, session statistics can be gathered by the network performance monitor utilizing the buffer trace function or other internal functions of the CAM. The network performance monitor intercepts internal calls of the CAM and reads control blocks from the CAM. More specifically, the NPM hijacks the buffer trace and activates it for a desired resource. The network performance monitor intercepts calls to the buffer trace of the CAM and gathers information regarding the appropriate PIUs from control blocks of the CAM by copying the desired information into control blocks of the network performance monitor. The data is then processed in the network performance monitor through known methods, such as those described above, in order to obtain the appropriately processed data. This processed data is then used to adjust the operating parameters of the CAM to improve or adjust performance of the CAM as desired.

As mentioned above, this process has a number of drawbacks. First, this use of the buffer trace function of the CAM interferes with the ability of customers/users of the computer to use the buffer trace function to monitor for hardware and software errors in the network. Further, the customers/users have no means to manage this concurrent use of the buffer trace. Additionally, the network performance monitor is dependent upon internal details of the CAM, such as resource addresses as defined by the CAM. Any changes to the CAM, such as the changing of an address of a resource or the installation of a new release of the CAM, requires that the network performance monitor be appropriately modified to compensate for these changes. Serviceability is also a problem, since a problem in one product can manifest itself as a problem in the other product, due to the common internal processing routines.

SUMMARY OF THE INVENTION

Accordingly, an object of the present invention is to provide an alternate technique for the network performance monitor to implement its data collection function.

Another object of the present invention is to return exclusive use of the buffer trace to customers/users of the CAM.

Yet another object of the present invention is to remove dependencies of the network performance monitor from internals of the CAM so as to eliminate the necessity of updating both systems whenever one system is modified.

A still further object of the present invention is to eliminate the need for the network performance monitor to provide cross instructions into the CAM so as to improve customer/user response time and decrease path links in between the NPM and the CAM.

Yet another object of the present invention is to provide an interface between the network performance monitor and the CAM so as to prevent dual processing errors and improve serviceability of each system.

Other objects and advantages of the present invention will be set forth in part in the description and the drawings which follow, and in part, will be obvious from the description or may be learned by practice of the invention.

To achieve the foregoing objects, and in accordance with the purpose of the invention as broadly described herein, a method is provided for obtaining performance data for predetermined resources associated with a network which employs a communication access method. The method comprises the steps of requesting the CAM to monitor the predetermined resource, obtaining the monitored data from the CAM, and processing the monitored data to determine network performance relative to the resource. The invention also provides a system for obtaining performance data for resources of a network which includes a communication access method. The system includes means for requesting performance data from the communication access method for a predetermined resource, means for monitoring information units passing to and from the predetermined resource from and to the communication access method, means for providing formatted data regarding the information units to a predetermined exit, and means for obtaining the formatted data from the predetermined exit and processing the formatted data to obtain performance data for the predetermined resource.

The present invention will now be described with reference to the following drawings, in which like reference numbers denote the same elements throughout.

BRIEF DESCRIPTION OF THE DRAWINGS

FIG. 3 illustrates the format of an NPM request to start session collection for a given resource; and FIG. 4 illustrates the format of an NPM request to stop session collection for a given resource.

DESCRIPTION OF THE PREFERRED EMBODIMENT

Figure 1:
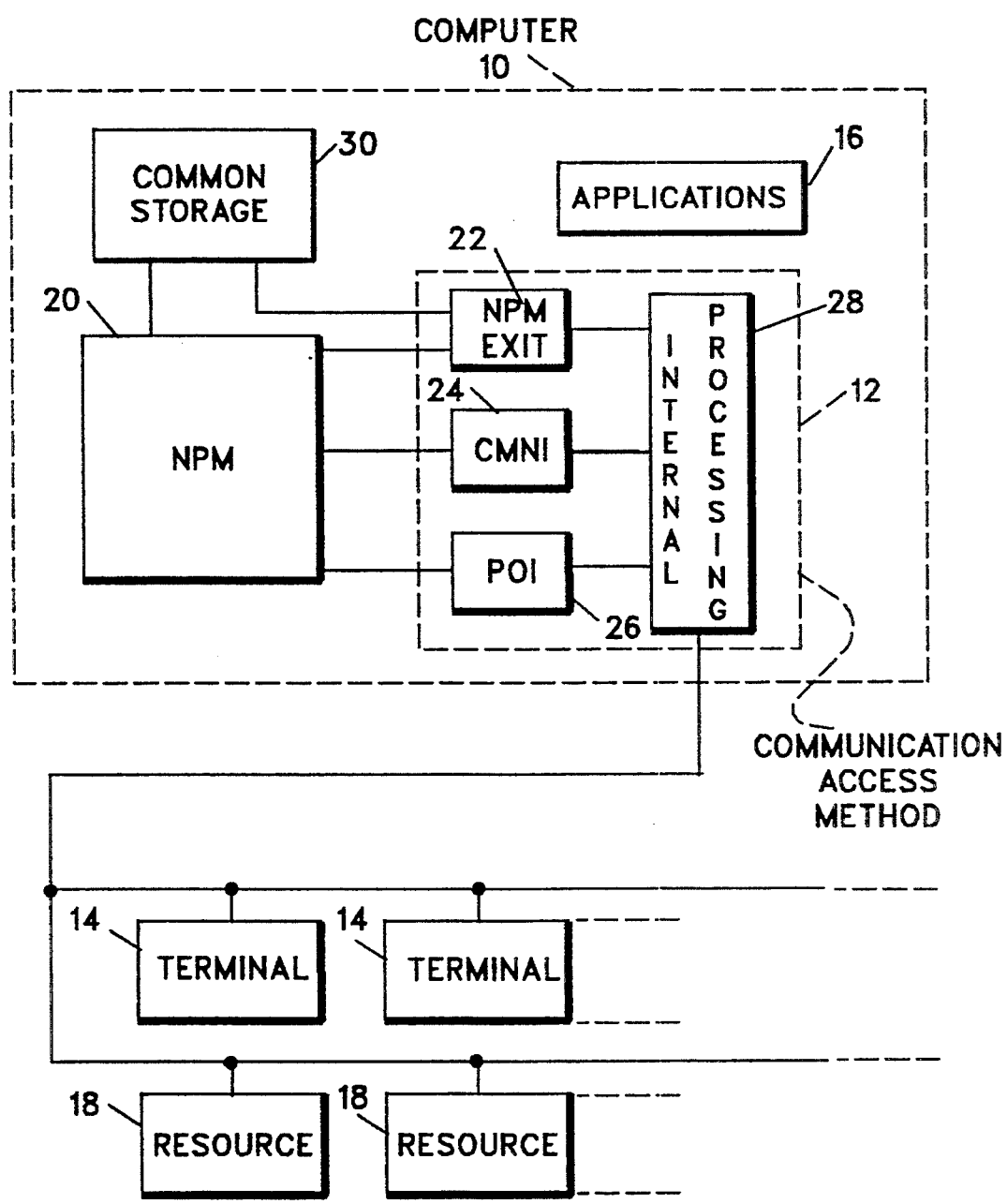
FIG. 1 is a block diagram of the system in which the present invention is embodied.

An embodiment of the present invention will now be described with initial reference to FIG. 1. A mainframe computer 10 includes a CAM 12 loaded therein which permits the computer 10 to be utilized by customers/users on terminals 14. Customers/users on the terminals 14 can effectively simultaneously run any of a variety of applications 16 loaded on the computer 10 and utilize other resources 18 associated with the computer 10. As discussed with reference to the related art, a network performance monitor (NPM) 20 is also loaded onto the computer 10 for monitoring the performance of the CAM 12.

The problems associated with the prior art are resolved by removing the necessity for NPM to work within the internals of the CAM. According to the present invention, both the NPM 20 and the CAM 12 are modified to provide improved communication therebetween, which reduces or eliminates the described usability, compatibility and serviceability problems. This solution will now be discussed below.

As discussed above, the prior art NPM invaded the domain of the CAM and took over the buffer trace or another internal feature of the CAM, thereby causing the problems described above. In order to create a clear channel of communication between the NPM 20 and the CAM 12, the present invention provides for modification of the CAM 12 to include an NPM performance exit 22. To accomplish this, an NPM performance exit subroutine is loaded into the load library of the CAM 12 so that the CAM 12 can access the new NPM exit 22. Additionally, the CAM 12 is modified to recognize the NPM 20 as a communication network management (CNM) application. This permits the NPM 20 to access a CNM interface (CMNI) 24, which already exists within the CAM 12. One skilled in the art can readily make the necessary adjustments to the prior NPM and CAM to implement these modifications, so details regarding the implementation of these modifications will not be provided here.

Figure 2:
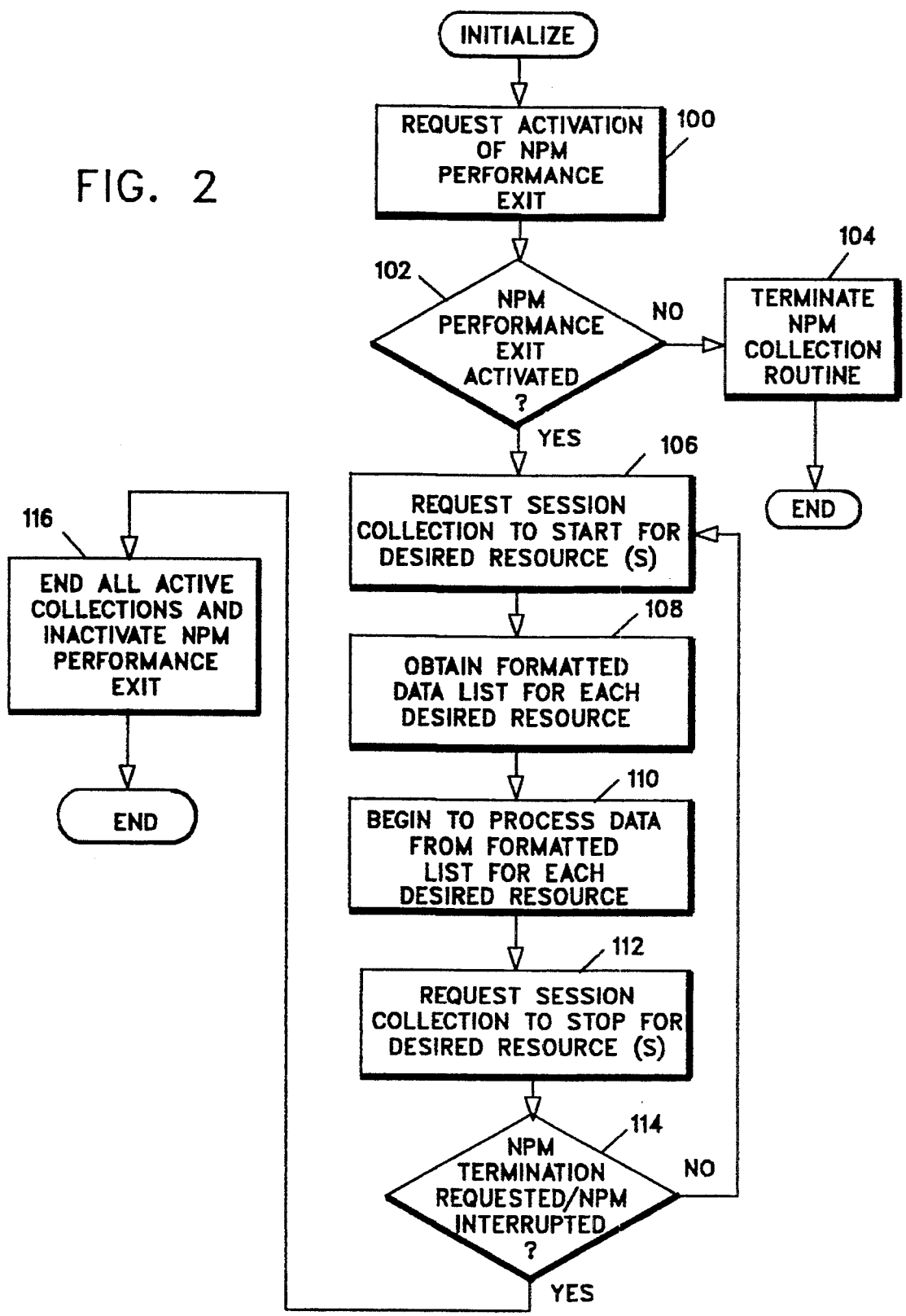
FIG. 2 is a flow chart of the method of accessing the CAM for data according to the present invention.

After the communication shell described above has been provided, a technique for communication must still be established. Such a technique is described below. The process of requesting and transferring session data for use by the NPM 20 will now be described with reference to FIG. 1 and to the flow chart of FIG. 2. Upon initialization, the NPM 20 requests the CAM 12 to activate the NPM performance exit 22 (step 100). This request to activate the NPM performance exit 22 is sent from the NPM 20 to the CAM 12 through a program operator interface (POI) 26 of the CAM 12. If the CAM 12 is unable to activate the NPM performance exit 22 (step 102), then the CAM 12 will inform NPM 20 of this factor via the POI 26 and the NPM 20 will terminate the collection routine (step 104). If the CAM 12 is able to activate the NPM performance exit 22, then the NPM 20 will issue the appropriate start collection messages to the CAM 12 via the CMNI 24 of the CAM 12 (step 106). As opposed to the prior technique, in which the NPM 20 pirated the internals of the CAM 12 in order to intercept the desired session data, in the present invention the NPM 20 sends a formatted message requesting that a session collection be started. The CAM 12 now receives these messages from the NPM 20 via the CNM interface 24. One message is required for each resource for which session data is desired. The format of such a start collection message is provided in FIG. 3. Bytes 0-7 are format bytes for a typical CAM, byte 8 provides the start command, and bytes 9-16 identify the resource. The resource named in bytes 9-16 is in character format, and the resource can be any terminal, printer, node, application, etc., accessible by the CAM 12.

The CAM 12 should be modified to act upon the formatted request. For example, the CAM 12 must be able to convert the resource name from character format into the address of the resource so that PIUs going to and from the named resource can be monitored at the internal processing 28 of the CAM 12. This can be implemented by providing the CAM 12 with a mapping feature for associating the resource name with the resource address. By updating the mapping feature in the CAM 12 whenever a resource address changes, the NPM 20 need not be concerned with address changes. The CAM 12 should also be modified to begin the session collection for the named resource upon receipt of the start collection message.

The CAM 12 then controls its own internals to monitor performance of the specified resource. The CAM 12 calls the NPM performance exit 22 once for each outbound PIU and once for each inbound PIU. The CAM time stamps each PIU and sends formatted data to the NPM exit 22 which includes the direction of the PIU and the time at which the PIU was received by the internal processing 28. When the CAM 12 sends data to the NPM exit 22, the CAM 12 also communicates this fact to the NPM 20 via the NPM exit 22.

In the preferred embodiment, the formatted data from the CAM 12 is sent via the NPM performance exit 22 to common storage 30. Since the NPM 20 is also informed that the data has been forwarded to the common storage 30, the NPM 20 can retrieve and process this data at its convenience (step 108–110). Alternatively, the formatted data could be sent directly to the NPM 20. This alternative requires that some sort of buffer be provided in the NPM 20 to hold the formatted data until the NPM 20 is ready to process the data. Processing is carried out in the manner discussed above relative to the prior technique and will not be discussed here in detail (step 110). Very briefly, based on the formatted data, the NPM 20 is able to process information regarding the resource to obtain the host time, the system time and the volume statistics necessary to measure the performance of the CAM relative to the resource. This information is then used in determining and implementing the appropriate adjustments to the CAM 12 or the resource required or desired by the customers/users. These statistics also aid in pinpointing the location of problems or bottlenecks in the network, and in monitoring whether the system is meeting required and/or specified and/or contracted response times for customers/users.

When the NPM operator decides to terminate the performance monitoring for a given resource, the NPM 20 issues a formatted command such as that illustrated in FIG. 4 to stop the collection request. This formatted command is sent to the CAM 12 via the CMN interface 24 (step 112). The formatted command is substantially identical to that of FIG. 3, except that byte 8 includes a command which is interpreted by the CAM 12 to stop performance monitoring for the resource identified in bytes 9–16.

Any number of resources can be monitored at once, although a different start command is required for each resource or set of resources. Steps 106–112 essentially run continuously, with start and stop commands being sent from the NPM 20 to the CAM 12, formatted data being collected by the NPM 20 from the CAM 12, and processing of received data being carried out by the NPM 20 (in accordance with the known processing techniques). If the NPM 20 is interrupted or termination is requested by the NPM operator (step 114), then the CAM 12 will automatically end all active session collections and in activate the NPM performance exit 22 (step 116). Until either event occurs, steps 106–112 continue to operate.

As mentioned, while, the NPM performance exit 22 is activated, the NPM 20 processes the data forwarded by the CAM 12 in the manner described previously. Since the formatted data provided by the CAM 12 includes a time stamp which indicates exactly when the PIU passed the internal processing 18, host, system and application times for each given resource can be determined based on receipt of data for each of the outbound PIU and the inbound PIU. Typically, the formatted data will also include the data included in the PIU so that volume statistics can be determined. However, the CAM 12 is programmed to include in formatted data information as to whether or not the PIU contains confidential data. If so, the operator of the NPM 20 will not be able to access the data that was contained in the PIU. This protects the confidentiality of the data, and functions as a failsafe that was not previously available when the NPM was pirating the internals of the CAM.

While there has been described a preferred embodiment of the present invention, variations and modifications in that embodiment may occur to those skilled in the art once they learn of the basic inventive concepts. Therefore, it is intended that the appended claims shall be construed to include both the preferred embodiment and all such variations and modifications as fall within the the spirit and scope of the invention. What is desired to be protected by Letters Patent is:

We claim:

1. A method for obtaining performance measurements for at least one selected resource in a computer network, said computer network containing a plurality of resources and executing a communication access program to control communication sessions between pairs of said plurality of resources, comprising the steps of:

activating a performance exit interface in the communication access program to signal that performance data is to be collected for said at least one selected resource;

requesting said communication access program to start the collection of performance data for each communication session between said pairs of plurality of resources having said at least one selected resource as one of said pairs of plurality of resources;

collecting said performance data for said each communication session having said at least one selected resource as one of said pairs of plurality of resources without impairing any trace facilities of said communication access program and providing said performance data to said performance exit interface;

processing said performance data to determine performance measurements for said at least one selected resource; and terminating said collection of performance data for said each communication session and deactivating said performance exit interface.

2. The method of claim 1 wherein the step of requesting said communication access program to start collection of performance data for each communication session includes sending a formatted message to said performance exit interface, said formatted message having a first field to set a performance trace function and a second field that identifies said at least one selected resource.

3. The method of claim 1 wherein said performance data includes transit time and directional information for said at least one selected resource.

4. The method of claim 3 wherein said collected performance data is formatted by said communication access program before being provided to said performance exit interface.

5. A system for obtaining performance measurements for at least one selected resource in a computer network, said computer network containing a plurality of resources and executing a communication access program to control communication sessions between pairs of said plurality of resources, comprising:

means for activating a performance exit interface in the communication access program to signal that performance data is to be collected for said at least one selected resource;

means, cooperative with said means for activating, for requesting said communication, access program to start the collection of performance data for each communication session between said pairs of plurality of resources having said at least one selected resource as one of said pairs of plurality of resources;

means, responsive to said means for requesting, for collecting said performance data for said each communication session having said at least one selected resource as one of said pairs of plurality of resources without impairing any trace facilities of said communication access program;

means, cooperative with said means for collecting, for providing said performance data to said performance exit interface;

means for processing said performance data that has been provided to said performance exit interface;

means cooperative with said means for processing, for terminating said collection of performance data for said each communication session; and means, cooperative with said means for terminating, for deactivating said performance exit interface.

6. The system in claim 5 where said means for requesting said communication access program to start the collection of performance data for each communication session between said pairs of plurality of resources includes means for formatting and sending a message to said performance exit interface that has a first field to set a performance trace function and a second field that identifies said at least one selected resource.

7. The system of claim 5 wherein said performance data includes transit time and directional information for said at least one selected resource.

8. The system of claim 7 wherein said communication access program includes means for formatting said collected performance data before it is provided to said performance exit interface for processing.

* * * * *